Patented July 20, 1943

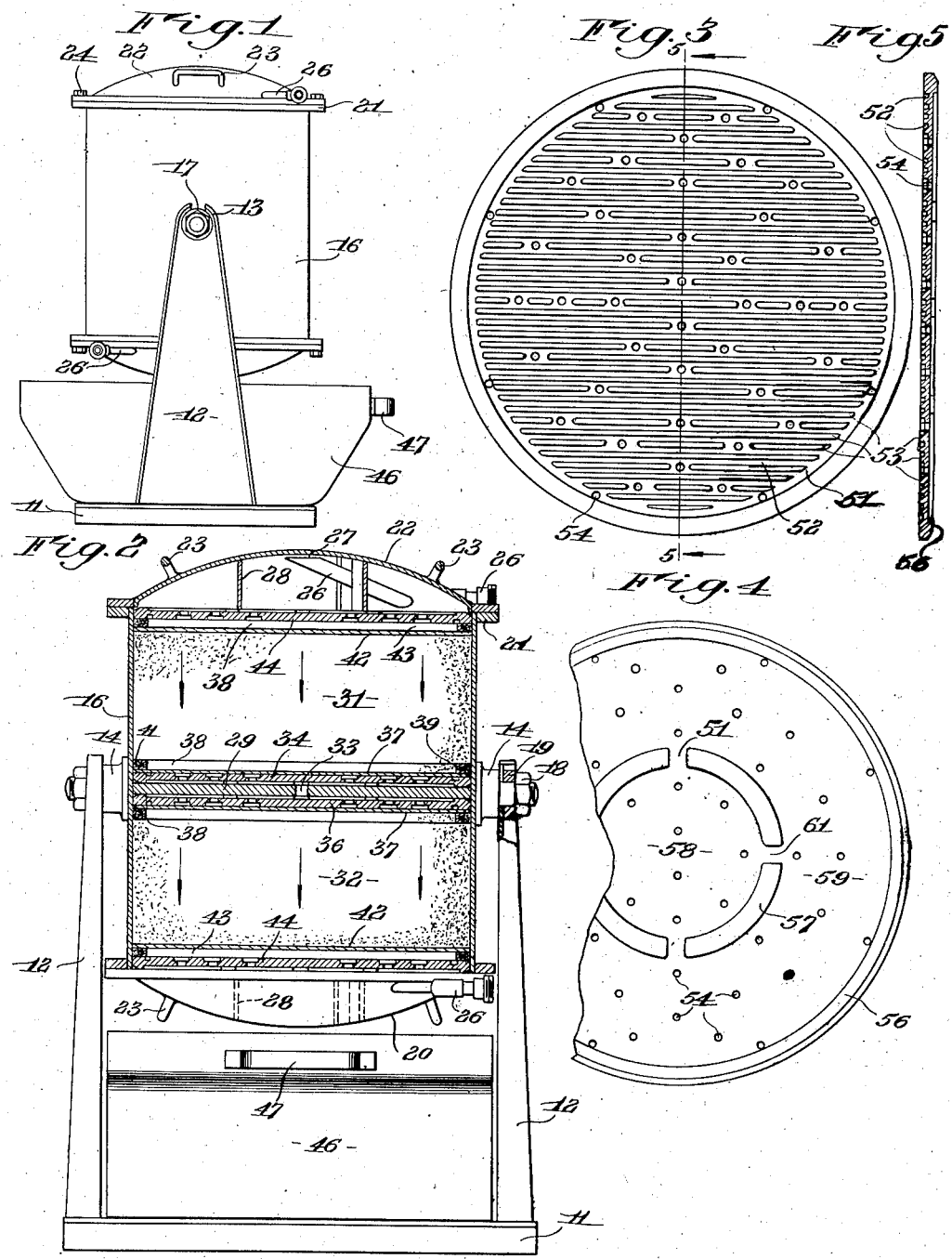

2,324,764

UNITED STATES PATENT OFFICE 2,324,764

FILTER CONSTRUCTION AND METHOD OF FILTERING

Eben Hunter Carruthers, Astoria, Oreg., and Henry Tyson Moore, Drexel Hill, Pa., assignors, by mesne assignments, to The Sharples Corporation, Philadelphia, Pa., a corporation of Delaware Application August 14, 1940, Serial No. 352,560

3 Claims. (Cl. 210—137)

The present invention relates to filters and to a method of filtering.

An object of the invention is to provide a generally improved and simplified filter construction which may be built at a reasonable cost and which is extremely convenient and economical to operate.

Another object of the invention is the provision of a filter which may be charged with filtering material and made ready for operation with a minimum of physical effort, and from which the spent filtering material may be readily discharged, and the spent filtering material quickly replaced with fresh filtering medium.

The invention further contemplates a method of filtering or a method of operating a filter so as to economize on the use of filtering material.

Other objects and advantages of the invention will be particularly pointed out in the claims and will be apparent from the following description, when taken in connection with the accompanying drawing, in which:

Fig. 1 is a side elevation of the filter;

Fig. 2 is a sectional view of the filter;

Fig. 3 is a view of one side of one form of grid which may be used in the filter;

Fig. 4 is a view of the other side thereof; and

Fig. 5 is a sectional view of the grid.

The filter and method of filtering of our invention may, in general, be employed in any filtering process wherein impurities are to be removed from a liquid by flowing the liquid through a bed of filtering material. The filtering material may be fuller's earth, clay, sand, or other suitable filtering media. The filter and method of filtering of our invention may, for example, be employed in connection with the purification process shown and described in the copending application of Eben H. Carruthers, Serial No. 330,146, filed April 17, 1940, entitled Method and apparatus for oil purification.

The filtering apparatus, in general, comprises a base 11, and a pair of preferably channel-shaped pedestals 12 which extend upward from the base. The upper ends of the pedestals are provided with saddles 13 for the reception of pivots, generally indicated by the numeral 14, mounted on the sides of a container or drum 16 for the filtering medium. As shown in the drawing, the upper ends of the pedestals are slotted at 17 for the reception of the pivots and the ends of the pivots are threaded to receive nuts 18. Washers 19 are provided between the pedestals and the nuts 18. By loosening the nuts 18 the container or drum may be pivoted in the saddles 13 so as to bring either end of the drum uppermost. Preferably the drum is pivoted substantially along its center of gravity so that it may be manually inverted.

While the drum may be of any suitable size, dimensions, and shape, there is shown in the drawing a cylindrical drum having open ends which may be provided with flanges or rings 21 welded to the ends of the side walls. The open ends of the drum are closed by flanged covers or head plates 20 and 22, which are preferably dome-shaped so as to provide a compartment or well at each end of the drum.

Since the construction of both head plates is the same, a description of one will suffice. The head plate 22 may be provided with handles 23 by which it may be conveniently removed and replaced, and the flanges thereof may be bolted to the flanges 21 by nuts 24 (Fig. 1). As shown in the drawing, the head plate 22 is provided with a conduit 26 which is threaded at its outer end for the reception of a pipe and which extends through the wall of the head plate and terminates adjacent the center and closely adjacent the inner wall of the head plate, as shown at 27. The inner surface of the head plate may be provided with ribs 28 which may be welded to the wall of the head plate and which are for a purpose which will later appear.

Approximately at the horizontal center of the drum is located a dividing wall 29 which separates the interior of the drum into two filter bed sections, 31 and 32. The dividing wall may be welded in position and may be provided with a series of apertures to permit the flow of liquid from one section to the other. In the drawing, to insure rather thorough comingling of the liquid after it has passed through one filter bed and before it passes to the next, there is shown only a single opening 33 located at the center of the dividing wall. Above and below the dividing wall 29 are located grids 34 and 36 which may be of any suitable construction, the particular construction employed being later described.

Above the grid 34 and below the grid 36 are located filter pads 37 which are of such character as to retain the filtering material in position against any substantial migration with the liquid being filtered. Any suitable filtering pad may be employed. It is desirable, in filtering most liquids, that the filtering pad offer as little resistance to flow of the liquid as possible, and we have found ordinary burlap to be suitable for this purpose.

The filtering pads 37 are held in position by sealing rings 38. Each of the sealing rings comprises an annular channel-shaped member 39 in the channel of which is held a sealing material 41. The sealing material may be felt, rubber, or such other suitable material as will, when pressed against the inner side walls of the drum, form a tight seal thereagainst to prevent the liquid being filtered from flowing past the sealing ring. The top and bottom of the drum are each provided with a filter pad 42, a sealing ring 43, and a grid 44. Each of these elements may be similar in construction to the corresponding elements, adjacent the dividing wall, above described. Each of the grids is supported and held in position against the weight of the filtering material by the ribbing 28, the weight of the filtering material being applied to the particular grid which happens to be lowermost.

Supported by the base 11 is a container or pan 46 which lies beneath the drum and is adapted to receive spent filtering material when the drum is emptied. The pan may be of any suitable size, shape, and construction, and may be provided with a handle 47 to enable removal of the pan.

Any suitable type of grid may be employed. For example, the grid might be a plain apertured disk, such as would support the filtering material and yet permit free flow of the liquid therethrough. However, for maximum filtering efficiency, we have found that it is preferable that the grid serve to substantially uniformly distribute the liquid over the area of the filter bed as, for example, over the top surface of the upper filter bed 31 (as shown in Fig. 2).

For this purpose one surface of the grid, as shown in Fig. 3, is provided with an annular groove 51 which communicates with channels 52 formed between ribs 53. The ribs and channels may be located as desired in the surface of the grid, but preferably extend parallel to each other. The liquid flows along the channels and substantially evenly distributes itself over the grid surface. Any desired number of apertures 54 may be employed and arranged as desired, but preferably arranged so that they communicate with the channels and are substantially uniformly distributed over the grid surface.

The opposite side of the grid has a rim 56 and an annular baffle 57 forming an inner section 58 and an outer section 59. The baffle 57 has gateways 61 which connect the inner and outer sections 58 and 59.

The grids are mounted in position, as shown in the drawing, the top grid as viewed in Fig. 2 being arranged with the ribbed surface lowermost so that when liquid to be filtered is supplied through the conduit 27, it drops (assuming a gravity flow of the liquid through the filter) upon the grid and distributes itself over the surface thereof. After flowing through the apertures 54, it reaches the ribbed side of the grid and tends to flow along the channels and substantially evenly distribute itself over the top area of the filter bed.

After flowing through the upper filter section 31, it reaches the grid 34 which is arranged with its ribbed surface uppermost. The liquid then flows along the channels until it reaches the apertures 54 and flows to the under side of the grid 34. The under side of the grid 34, together with the dividing wall 29, then acts as a collector and tends to mix the liquid and render it more or less homogeneous. The baffle 57 acts as an obstruction so as to retard the flow and cause the liquid to become somewhat more thoroughly mixed before it passes through the aperture 33, which is the only inlet to the lower filter section.

The grid 36 is reversely arranged and tends to uniformly distribute the liquid over the upper surface of the lower filter bed in the same manner as described above in connection with the grid 44. The lowermost grid is arranged similarly to the grid 44 with the ribbed surfaces facing each other so that when the lower filter section is uppermost it will serve the same function as the upper grid 44. After passing through the lower filter bed and out through the apertures in the lower grid, the liquid drops into the well, formed by the lower head plate 20, and may be withdrawn from the lower head by a suitable suction pump (not shown). It will be noted that the end 27 of the conduit is adjacent the wall of the head plate and the lowest point of the well so that substantially all of the liquid may be sucked from the well formed by the head plate.

The filter sections 31 and 32 are filled with any suitable filtering material, such as fuller's earth, in a manner which will be readily apparent. Either of the head plates is removed and either filter section filled with filtering material, the parts replaced and the head bolted in position. The filter is then rotated and the other filter section is filled with filtering medium. In filtering some materials, such as lubricating oil, it is desirable to heat the liquid to a temperature of, for example, 180° F. to 200° F. Preferably the oil is brought to this temperature before being passed through the filter.

While a gravity flow of liquid may be employed in the filter, it is preferable that the liquid be forced and drawn through the filter sections in series by pressure applied through the upper conduit and suction through the lower conduit. It is desirable that both pressure and suction be employed although either suction or pressure may be used alone. Thus the liquid is forced and drawn rather rapidly through the filter. The flow through the filter, if gravity alone is employed, is rather slow. When pressure is employed, of course, the upper head plate will be flooded with liquid so that the pressure thereof is exerted on the grid so as to force the liquid through the grid apertures and through the filtering medium.

After the filter has been in operation for some time the clay or other filtering material loses its ability to extract impurities from the liquid being filtered. In the case of purification of engine lubricating oil, the fact that the filtering medium has been spent can be ascertained by observing the character of the oil as it leaves the filter. When it is desired to change the filtering material, since the upper filter bed does most of the work, the material therein becomes spent first. After the conduits 26 have been disconnected the drum is rotated to bring the filtering bed 31 to a lowered position so as to permit removal of the head plate 22, the grid 44, and the sealing ring 43, and thus permit the filtering material to drop by gravity into the pan 46. When the filter section 31 is emptied the drum is again rotated to bring the filter section 31 uppermost whereupon the filter section 31 may be filled with clay or other filtering medium.

The clay is then leveled off in the filtering section 31, the filtering pad of burlap, or other suitable material, applied on top of the leveled surface, and the sealing ring and grid placed in position. The head 22 is then bolted to the drum and the container again rotated to place the filter section 31 in a lowered position. After the inlet and outlet connections are made to the conduits 26, the filter may be placed in operation.

The length of time which the filtering material will last depends upon the character of the liquid being filtered and other factors. Experience will determine how frequently the filtering material should be replaced. As soon as the failure of the filter to clear up or remove impurities from the liquid is noted, the same procedure is followed in replacing the filtering material in the filter section 32 which is then in the uppermost position. In operating the system the fresh filtering bed is always the second bed of the series with respect to the entering liquid.

The method of operating the filter, as above described, results in a considerable saving in clay or other filtering medium, since the partly spent clay is always the first bed of the series through which the liquid flows so that the clay may be completely spent before it is removed and replaced.

While we have described the filter as being operated so that the liquid flows downward through the filter, it will be appreciated that if pressure is employed with suction applied through the upper conduit, the liquid may be forced to flow upward or horizontally through the filter beds. The apparatus described is particularly convenient in enabling handling and servicing of the filter since the filter beds may be quickly emptied and their contents replaced. Preferably in changing one of the filter beds the filter is drained of all liquid which may be conveniently removed. If desired, air pressure may be employed to force a larger percentage of the liquid out of the clay before the clay is discarded. Moreover in draining the filter it is sometimes desirable that the liquid be hot. Cold oil, for example, will not readily drain from the filtering material.

While we have shown the preferred form of the filter of our invention, and described the preferred method of its operation, it will be apparent that various changes and modifications may be made therein, particularly in the form and relation of parts, without departing from the spirit of our invention as set forth in the appended claims.

We claim:

1. A method of filtering in which the filter has at least two filter beds and inlet and outlet connections for the liquid to be filtered which comprises, arranging the filter beds and connections so that the liquid flows through the filter beds in series, replacing the filtering material in the first bed of said series with fresh filtering material when it becomes spent, and then rearranging the connections so that the liquid flows first through a filter bed in which the filtering material is partly used and later through a filter bed containing the fresh filtering material.

2. A filter structure comprising a container having ports connecting opposite ends thereof with a source of liquid supply and a liquid discharge zone, respectively, a fixed partition located centrally between said inlet and discharge ports, said partition being perforated to permit passage of liquid therethrough, a pervious filter bed mounted between said partition and said feed port for removal through the end of the container to which it is adjacent, a second pervious filter bed mounted between said partition and said discharge port for removal through the end of the container to which it is adjacent, removably mounted means between each of said filter beds and the respective ends of said container for securing said filter beds in said container and means for pivotally supporting said container for rotation about an axis transverse to the direction of fluid flow through the filter.

3. A filter structure as defined in claim 2 in which the pivotal support for said container is on an axis having a substantial horizontal component.

EBEN HUNTER CARRUTHERS.
HENRY TYSON MOORE.